No. 736,744. PATENTED AUG. 18, 1903.
L. R. KRATZMUELLER.
SURGICAL ÉCRASEUR.
APPLICATION FILED FEB. 28, 1903.
NO MODEL.
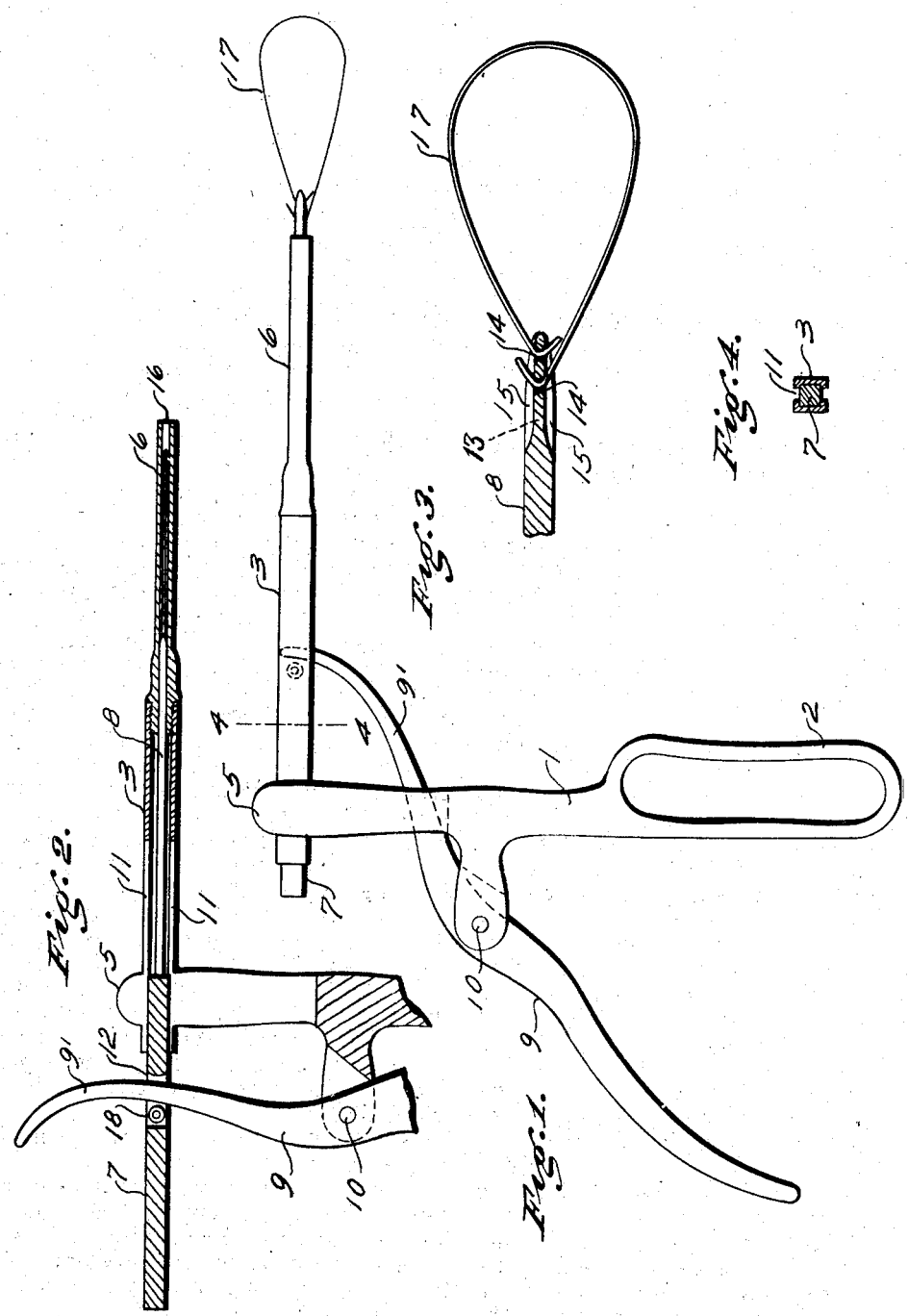
Witnesses: Rudow Rummler, Blanche Michael.
Inventor: Louis R. Kratzmueller
by Rummler & Rummler
his Attorneys No. 736,744.

Patented August 18, 1903.

UNITED STATES PATENT OFFICE.

LOUIS R. KRATZMUELLER, OF CHICAGO, ILLINOIS.

SURGICAL ÉCRASEUR.

SPECIFICATION forming part of Letters Patent No. 736,744, dated August 18, 1903.

Application filed February 28, 1903. Serial No. 145,470. (No model.)

*To all whom it may concern:*

Be it known that I, LOUIS R. KRATZMUELLER, a citizen of the United States of America, and a resident of Chicago, in the county of Cook and State of Illinois, have invented certain new and useful Improvements in Surgical Instruments, of which the following is a specification.

The main object of my invention is to provide a simple and improved surgical instrument suitable for use in cutting or gripping certain tissues, and particularly adapted for such operations as the removal of the tonsils and growths in the ear, nose, and throat. I accomplish this object by the device shown in the accompanying drawings, in which—

Figure 1 is a side elevation of a surgical instrument constructed according to my invention. Fig. 2 is a longitudinal section of the same, partly broken away. Fig. 3 is an enlarged section of a portion of same, showing the means for securing a loop of wire to same. Fig. 4 is a transverse section of the shank of same on the line 4 4 of Fig. 1.

In the device shown the handle 1 is suitably formed at the end 2 for being grasped by the hand of the operator. The shank 3 is rigidly secured at the end 5 of the handle 1 and is disposed transversely of said handle. The shank 3 is tubular and is preferably of cylindrical form at its free end 6. A member 7 is slidably mounted within the cavity in the interior of the shank 3 and is provided with a needle-like extension 8, fitting the interior of the part 6 of the shank 3. A lever 9 is fulcrumed at 10 to the handle 1 and has a curved arm 9' extending through the longitudinal slots 11 in the shank 3 and through the aperture 12 in the member 7. The arm 9' of the lever 9 has a cam action on the shoulders at the ends of the aperture 12 and serves to move the member 7 longitudinally through the cavity within the shank 3, the limiting positions of the member 7 within the shank 3 being indicated, respectively, in Figs. 1 and 2.

The relative movement of the shank 3 and the member 7 serves to operate a gripping or cutting device at the end of the shank 3. In the drawings this cutting device is shown in the form of a snare, being a loop of wire 17 or other suitable filament adapted to be drawn into the shank 3 and act as a cutting edge when said loop is contracted.

The end 13 of the member 7 is provided with two eyes 14 and is grooved at 15 in the way of such eyes. When the lever 9 and the handle 1 are in the position shown in Fig. 1, the end 13 of the member 7 projects through the aperture 16 in the end of the shank 3 and the ends of a loop of wire 17 are attached thereto, as shown in Fig. 3. The slot 12 is preferably provided with a friction-roller 18, which forms a shoulder for the cam-arm 9' to bear upon.

The operation of the device shown is as follows: A filament of wire is threaded into the eyes 14 of the member 7 when the parts of the device are in the position shown in Fig. 1. The arm 18 of the lever 9 is now moved toward the handle 1 sufficiently to draw the member 7 into the shank 3, so that the part 6 will cover the ends of the wire 17, thereby securely fastening the ends of the wire and protecting the patient from injury by such ends. The loop 17 is then passed over the tonsil or other part that is to be cut and the lever 9 drawn down against the handle 1, drawing the loop 17 entirely into the part 6 of the shank 3. The rapid contraction of the loop causes the fine wire to cut through the tissues which are engaged by same.

It will be seen that some of the details of the construction shown may be altered without departing from the spirit of my invention. I therefore do not confine myself to such details, except as hereinafter limited in the claims.

What I claim as my invention, and desire to secure by Letters Patent, is—

1. In a surgical instrument, the combination of a handle; a shank secured to said handle and disposed transversely of same; a member mounted on said shank and slidable longitudinally thereof; a shoulder on said member; a lever fulcrumed on said handle and having thereon a cam adapted to slidingly engage said shoulder and cause said member to move along said shank, when said lever is turned on its fulcrum, substantially as described.

2. In a surgical instrument, the combination of a handle; a tubular shank secured to said handle and disposed transversely of same; a member mounted within said shank and slidable longitudinally thereof; a shoulder on said member; a lever fulcrumed on said handle and having thereon a cam adapted to slidingly engage said shoulder and cause said member to move along said shank, when said lever is turned on its fulcrum, substantially as described.

3. In a surgical instrument, the combination of a handle slotted near one end; a tubular shank secured to the slotted end of said handle, disposed transversely of said handle and having therein a longitudinal slot substantially in the plane of the slot in said handle; a member mounted on said shank and slidable longitudinally thereof; a shoulder on said member, a lever fulcrumed on said handle and having thereon a cam extending through the slots in said handle and shank and engaging said shoulder, said cam being adapted to slidingly engage said shoulder and cause said member to move along said shank when said lever is turned on its fulcrum, substantially as described.

4. In a surgical instrument, the combination of a handle; a hollow shank secured to said handle and having an aperture at one end; a member mounted within said shank and slidable longitudinally thereof; a filament having its ends secured to said member and forming a loop outside of said aperture; and a cam adapted to move said member along said shank and draw said filament through said aperture, thereby contracting said loop, substantially as described.

5. In a surgical instrument, the combination of a handle; a hollow shank secured to said handle and having therein a slot extending longitudinally of same; a member mounted in said shank and slidable longitudinally thereof, said member having a slot extending transversely through same and registering with the slot in said shank; a lever fulcrumed on said handle and having a curved arm extending through both of said slots and adapted, through sliding contact with said member to move same along said shank when said lever is turned on its fulcrum, substantially as described.

Signed at Chicago this 10th day of February, 1903.

LOUIS R. KRATZMUELLER.

Witnesses:
BLANCHE MICHAEL,
WM. R. RUMMLER.